(12) United States Patent
Mooneyham et al.

(10) Patent No.: US 10,965,573 B1
(45) Date of Patent: Mar. 30, 2021

(54) SYSTEMS AND METHODS FOR ONLINE USER PATH ANALYSIS

(71) Applicant: Wells Fargo Bank, N.A., San Francisco, CA (US)

(72) Inventors: Brian Mooneyham, Waxhaw, NC (US); Chris Cox, Boulder, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 505 days.

(21) Appl. No.: 14/845,888

(22) Filed: Sep. 4, 2015

Related U.S. Application Data

(60) Provisional application No. 62/047,783, filed on Sep. 9, 2014.

(51) Int. Cl.
| | | |
|---|---|---|
| *H04L 29/08* | (2006.01) | |
| *G06F 3/0481* | (2013.01) | |
| *G06F 3/0484* | (2013.01) | |
| *H04L 12/26* | (2006.01) | |
| *G06F 9/54* | (2006.01) | |

(52) U.S. Cl.
CPC ............ *H04L 43/10* (2013.01); *G06F 9/542* (2013.01)

(58) Field of Classification Search
CPC ... H04L 43/10; G06F 9/542; G06F 17/30867; G06F 17/30884
USPC ........................................................ 709/224
See application file for complete search history.

(56) References Cited

U.S. PATENT DOCUMENTS

| | | | | |
|---|---|---|---|---|
| 6,996,536 B1* | 2/2006 | Cofino | ................... | G06Q 30/06 705/26.8 |
| 7,774,335 B1* | 8/2010 | Scofield | ................ | G06F 16/951 707/709 |
| 8,166,394 B1* | 4/2012 | Melnicki | ............... | G06F 3/0482 715/200 |
| 8,548,991 B1* | 10/2013 | Zamir | ............... | G06F 17/30867 707/723 |
| 8,751,481 B2* | 6/2014 | Camoglu | ............ | G06F 16/9535 707/713 |
| 8,775,611 B1* | 7/2014 | Deshpande | ........ | G06Q 30/0201 709/223 |
| 8,782,166 B1* | 7/2014 | Deshpande | ........ | G06Q 30/0246 709/217 |
| 9,691,096 B1* | 6/2017 | Dai | .................... | G06Q 30/0631 |

(Continued)

OTHER PUBLICATIONS

Cambridge Dictionary, LIKELY | definition in the Cambridge English Dictionary, Aug. 20, 2015 (Year: 2015).*

*Primary Examiner* — Backhean Tiv
*Assistant Examiner* — Schquita D Goodwin
(74) *Attorney, Agent, or Firm* — Foley & Lardner LLP

(57) ABSTRACT

A computer-implemented method for analyzing a user session within an online environment includes receiving, by a path analysis computer system, usage data related to a user session within an online environment, wherein the usage data includes a plurality of events occurring within the user session, and generating, by the path analysis computer system, a plurality of user paths for the user session based on the usage data, including generating a separate user path beginning with each of the plurality of events. Each of the user paths is generated by selecting one of the plurality of events as a starting event, and arranging the plurality of events subsequent to the starting event in order of occurrence, such that the user path includes the starting event and each of the subsequent events up to and including a final event.

14 Claims, 9 Drawing Sheets

(56) References Cited

U.S. PATENT DOCUMENTS

| | | | | |
|---|---|---|---|---|
| 2002/0124075 A1* | 9/2002 | Venkatesan | G06F 17/30902 | 709/224 |
| 2004/0064443 A1* | 4/2004 | Taniguchi | G06F 16/958 | |
| 2007/0112730 A1* | 5/2007 | Gulli | G06F 17/30864 | |
| 2008/0307104 A1* | 12/2008 | Amini | G06F 17/30516 | 709/231 |
| 2010/0004975 A1* | 1/2010 | White | G06Q 30/02 | 705/7.29 |
| 2011/0219115 A1* | 9/2011 | Capel | G06F 15/173 | 709/224 |
| 2012/0078708 A1* | 3/2012 | Taylor | G06Q 30/0242 | 705/14.41 |
| 2012/0278330 A1* | 11/2012 | Campbell | G06F 16/48 | 707/740 |
| 2013/0066855 A1* | 3/2013 | Gupta | G06F 17/30864 | 707/722 |
| 2013/0124344 A1* | 5/2013 | Kolluri | G06Q 30/0241 | 705/14.73 |
| 2013/0144854 A1* | 6/2013 | Pantel | G06F 16/9535 | 707/706 |
| 2013/0204700 A1* | 8/2013 | Synett | G06Q 30/0255 | 705/14.53 |
| 2014/0109113 A1* | 4/2014 | Stacy | G09B 9/08 | 719/318 |
| 2014/0201225 A1* | 7/2014 | Deshmukh | G06F 16/951 | 707/758 |
| 2014/0201355 A1* | 7/2014 | Bishnoi | H04L 41/069 | 709/224 |
| 2014/0358825 A1* | 12/2014 | Phillipps | G06Q 30/0241 | 706/11 |
| 2014/0365453 A1* | 12/2014 | Alonso Lago | G06F 16/951 | 707/706 |
| 2015/0089424 A1* | 3/2015 | Duffield | G06Q 10/00 | 715/771 |
| 2015/0095146 A1* | 4/2015 | Adjaoute | G06Q 30/0255 | 705/14.53 |
| 2015/0213361 A1* | 7/2015 | Gamon | G06N 20/00 | 706/12 |
| 2015/0220417 A1* | 8/2015 | Diment | G06F 11/3438 | 709/224 |
| 2015/0269609 A1* | 9/2015 | Mehanian | G06Q 30/0246 | 705/14.45 |
| 2015/0339686 A1* | 11/2015 | Garcia | G06Q 30/0205 | 705/7.34 |
| 2015/0363842 A1* | 12/2015 | Hoyne | G06Q 30/0283 | 705/7.35 |
| 2016/0042288 A1* | 2/2016 | Cohen | G06F 16/951 | 706/11 |

* cited by examiner

Raw Data

| | Analytic Date Time | Analytic Type | CEO Company | CEO User | Channel | Feature |
|---|---|---|---|---|---|---|
| 402 | 1/10/2014 11:19 | Application | C Banking | U Banking | CEO Portal, Application | Account Summary, Cash Accounts |
| | 1/10/2014 11:19 | Application | C Banking | U Banking | CEO Portal, Application | Schedule Transfer |
| | 1/10/2014 11:19 | Application | C Banking | U Banking | CEO Portal, Application | Schedule Transfer, Verify Transfer |
| | 1/10/2014 11:19 | Application, Form data, Transfer funds | C Banking | U Banking | CEO Portal, Application | Schedule Transfer, Form Submission |
| | 1/10/2014 11:20 | Application, Transaction | C Banking | U Banking | CEO Portal, Application | Schedule transfer, Verify transfer, Transfer, Panel footer |
| | 1/10/2014 11:20 | Application, Transaction | C Banking | U Banking | CEO Portal, Application | Schedule transfer, Confirm transfer |
| | 1/10/2014 11:20 | Application | C Banking | U Banking | CEO Portal, Application | Schedule transfer, Confirm transfer, Close, Panel footer |

404 / 406 / 408 / 410 → 400

| Hit Key | Product | Session Key |
|---|---|---|
| 61180203083585 1ab55358fc458273 1 | Basic Banking | 07e3ae1eca88ea7104f26b1681d65a38 |
| 734af958085 6c7c66b014a42072d534f | Basic Banking | 07e3ae1eca88ea7104f26b1681d65a38 |
| 3e37ade8974ea161d582c44a4f873722 | Basic Banking | 07e3ae1eca88ea7104f26b1681d65a38 |
| 6198831aacf2860a0ee9abf3b994cb1a | Basic Banking | 07e3ae1eca88ea7104f26b1681d65a38 |
| 054942587c2066537a3a3d63ba90fe10 | Basic Banking | 07e3ae1eca88ea7104f26b1681d65a38 |
| 570c237daf5b2c05298971c3eedc70ac | Basic Banking | 07e3ae1eca88ea7104f26b1681d65a38 |
| 03b04e137b6f3c4cc1ed00484fe8ef9e | Basic Banking | 07e3ae1eca88ea7104f26b1681d65a38 |

| Hit Rank | X | Y |
|---|---|---|
| 1 | 60 | 920 |
| 2 | 200 | 200 |
| 3 | 650 | 175 |
| 4 | 125 | 10 |
| 5 | 425 | 50 |
| 6 | 950 | 175 |
| 7 | 725 | 25 |

FIG. 4B

|  | Step1 | Step2 | Step3 | Step4 | Step5 | Step6 | Step7 |
|---|---|---|---|---|---|---|---|
|  | Schedule transfer | Schedule Transfer, Verify Transfer | Schedule transfer, Form Submission | Schedule Transfer, Verify Transfer, Transfer, Panel footer | Schedule Transfer, Confirm Transfer | Schedule Transfer, Confirm Transfer, Close, Panel Footer | Last |
|  | Schedule Transfer, Verify Transfer | Schedule transfer, Form Submission | Schedule Transfer, Verify Transfer, Transfer, Panel footer | Schedule Transfer, Confirm Transfer | Schedule Transfer, Confirm Transfer, Close, Panel Footer | Last |  |
|  | Schedule transfer, Form Submission | Schedule Transfer, Verify Transfer, Transfer, Panel footer | Schedule Transfer, Confirm Transfer | Schedule Transfer, Confirm Transfer, Close, Panel Footer | Last |  |  |
|  | Schedule Transfer, Verify Transfer, Transfer, Panel footer | Schedule Transfer, Confirm Transfer | Schedule Transfer, Confirm Transfer, Close, Panel Footer | Last |  |  |  |
|  | Schedule Transfer, Confirm Transfer | Schedule Transfer, Confirm Transfer, Close, Panel Footer | Last |  |  |  |  |
|  | Schedule Transfer, Confirm Transfer, Close, Panel Footer, Last |  |  |  |  |  |  |

FIG. 4C

| X-Step1 | X-Step2 | X-Step3 | X-Step4 | X-Step5 | X-Step6 | X-Step7 | Y-Step1 | Y-Step2 | Y-Step3 | Y-Step4 | Y-Step5 | Y-Step6 | Y-Step7 | Path |
|---|---|---|---|---|---|---|---|---|---|---|---|---|---|---|
| 200 | 650 | 125 | 425 | 950 | 725 | Last | 200 | 175 | 10 | 50 | 175 | 25 | Last | Account Summary, Cash Accounts-Schedule Transfer-Schedule Transfer, Verify Transfer-Schedule Transfer, Form Submission-Schedule Transfer, Verify Transfer, Transfer, Panel Footer Schedule-Transfer, Confirm Transfer-Schedule Transfer, Confirm Transfer, Close, Panel Footer-Last |
| 650 | 125 | 425 | 950 | 725 | Last | | 175 | 10 | 50 | 175 | 25 | Last | | Schedule Transfer-Schedule Transfer, Verify Transfer-Schedule Transfer, Form Submission-Schedule Transfer, Verify Transfer, Transfer, Panel Footer-Schedule Transfer, Confirm Transfer-Schedule Transfer, Confirm Transfer, Close, Panel Footer-Last |
| 125 | 425 | 950 | 725 | Last | | | 10 | 50 | 175 | 25 | Last | | | Schedule Transfer, Verify Transfer-Schedule Transfer, Form Submission-Schedule Transfer, Verify Transfer, Transfer, Panel Footer-Schedule Transfer, Confirm Transfer-Schedule Transfer, Confirm Transfer, Close, Panel Footer-last |
| 425 | 950 | 725 | Last | | | | 50 | 175 | 25 | Last | | | | Schedule Transfer, Form Submission-Schedule Transfer, Verify Transfer, Transfer, Panel Footer-Schedule Transfer, Confirm Transfer-Schedule Transfer, Confirm Transfer, Close, Panel Footer Last |
| 950 | 725 | Last | | | | | 175 | 25 | Last | | | | | Schedule Transfer, Verify Transfer, Transfer, Panel Footer-Schedule Transfer, Confirm Transfer-Schedule Transfer, Confirm Transfer, Close, Panel Footer-Last |
| 725 | Last | | | | | | 25 | Last | | | | | | Schedule Transfer, Confirm Transfer-Schedule Transfer, Confirm Transfer, Close, Panel Footer-Last |
| Last | | | | | | | Last | | | | | | | Schedule Transfer, Confirm Transfer, Close, Panel Footer-Last |

FIG. 4C (Continued)

SYSTEMS AND METHODS FOR ONLINE USER PATH ANALYSIS

CROSS-REFERENCE TO RELATED APPLICATIONS

This application claims priority to U.S. Provisional Patent Application Ser. No. 62/047,783, entitled "Systems and Methods for Online User Path Analysis," filed on Sep. 9, 2014, which is incorporated herein by reference in its entirety and for all purposes.

BACKGROUND

The present disclosure relates generally to the field of web path analysis. More specifically, the present disclosure relates to systems and methods for determining and analyzing online usage data within a website or other online platform.

Web path analysis may be utilized to understand the behavior of users (e.g., visitors) of a website or other online platform. An example path analysis tool may collect data related to a chain of events performed by the user (e.g., user clicks, input, etc.) during a set period of time or in order to accomplish a particular task or transaction. The tool may also analyze the data collected in order to gain actionable insights into the user behavior. For instance, usage data for an online platform may be collected and analyzed in order to improve the efficiency of a particular user interface, for use in marketing a company's products, or for troubleshooting purposes.

Often it may be difficult to accurately determine a user's path within a particular browsing session. For example, the user may perform a similar task or operation using two separate and different paths, such as by beginning the task from a different starting point within the online platform. The user's path may also include extraneous information which can skew the analysis, such as movement back and forward between the same web pages or inadvertently refreshing the page before moving on to the subsequent action or event. Thus, it may not be useful to compare such dissimilar paths using the current path analysis tools.

SUMMARY

One embodiment of the present disclosure relates to a computer-implemented method. The method includes receiving, at a path analysis system, usage data related to an online user session, wherein the user session includes a series of events, and generating, at the path analysis system, a record for the user session based on the usage data, including determining a separate user path for each of the series of events, wherein each of the user paths includes a different of the events as a starting point for the user path and includes each subsequent event in up to and including the final of the events.

Another embodiment of the present disclosure relates to a path analysis system. The system includes a processor and machine readable having instructions stored therein that, when executed by the processor, cause the path analysis system to receive usage data related to an online user session, wherein the user session includes a series of events, and generate a record for the user session based on the usage data, including determining a separate user path for each of the series of events, wherein each of the user paths includes a different of the events as a starting point for the user path and includes each subsequent event in up to and including the final of the events.

Another embodiment of the present disclosure relates to a computer-implemented method. The method includes receiving, at a path analysis system, usage data for a user session, wherein the user session includes a series of events, ordering, at the path analysis system, the series of events based on order of occurrence, generating, at the path analysis system, coordinates based on the events, generating, at the path analysis system, a record for the user session, including determining a plurality of distinct user paths based on the series of events, wherein each of the user paths starts with a different event of the series of events and includes the subsequent events in order of occurrence, and aggregating, at the path analysis system, the generated record with at least one other record based on a shared starting event.

Another embodiment of the present disclosure relates to a computer-implemented method performed by one or more processors of a path analysis computer system. The method includes receiving, by the path analysis computer system, usage data related to a user session within an online environment, wherein the usage data includes a plurality of events occurring within the user session, and generating, by the path analysis computer system, a plurality of user paths for the user session based on the usage data, including generating a separate user path beginning with each of the plurality of events. Each of the user paths is generated by selecting one of the plurality of events as a starting event, and arranging the plurality of events subsequent to the starting event in order of occurrence, such that the user path includes the starting event and each of the subsequent events up to and including a final event.

Another embodiment of the present disclosure relates to a path analysis computer system. The system includes a processor and machine readable media coupled to the processor and having instructions stored therein that, when executed by the processor, cause the path analysis computer system to receive usage data related to a user session within an online environment, wherein the usage data includes a plurality of events occurring within the user session, and generate a plurality of user paths for the user session based on the usage data, including generating a separate user path beginning with each of the plurality of events. Each of the user paths is generated by selecting one of the plurality of events as a starting event, and arranging the plurality of events subsequent to the starting event in order of occurrence, such that the user path includes the starting event and each of the subsequent events up to and including a final event.

Another embodiment of the present disclosure relates to a computer-implemented method performed by one or more processors of a path analysis computer system. The method includes receiving, by the path analysis computer system, usage data related to a user session within an online environment, wherein the usage data includes a plurality of events occurring within the user session, and generating, by the path analysis computer system, a plurality of user paths for the user session based on the usage data, including generating a separate user path beginning with each of the plurality of events. Each of the user paths is generated by selecting one of the plurality of events as the starting event, and ordering those events from the plurality of events which are subsequent to the starting event in order of occurrence, such that the user path includes the starting event and each subsequent event of the plurality of events, up to and including a final event. The method also includes generating, by the path analysis computer system, a record for the user session by aggregating the plurality of generated user paths for the user session, and aggregating, by the path analysis computer system, the generated record with a second record, wherein the second record is based on a second user session within the online environment, and wherein the aggregating includes combining one or more of the plurality of user paths with one or more user paths of the second record based on a shared characteristic.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 4A is a table illustrating usage data for an online user session, according to an example embodiment.

FIG. 4B is a table illustrating events of the online user session arranged in order of occurrence, according to an example embodiment.

FIG. 4C is a table illustrating a record generated for the user session, according to an example embodiment.

DETAILED DESCRIPTION

Figure 1:
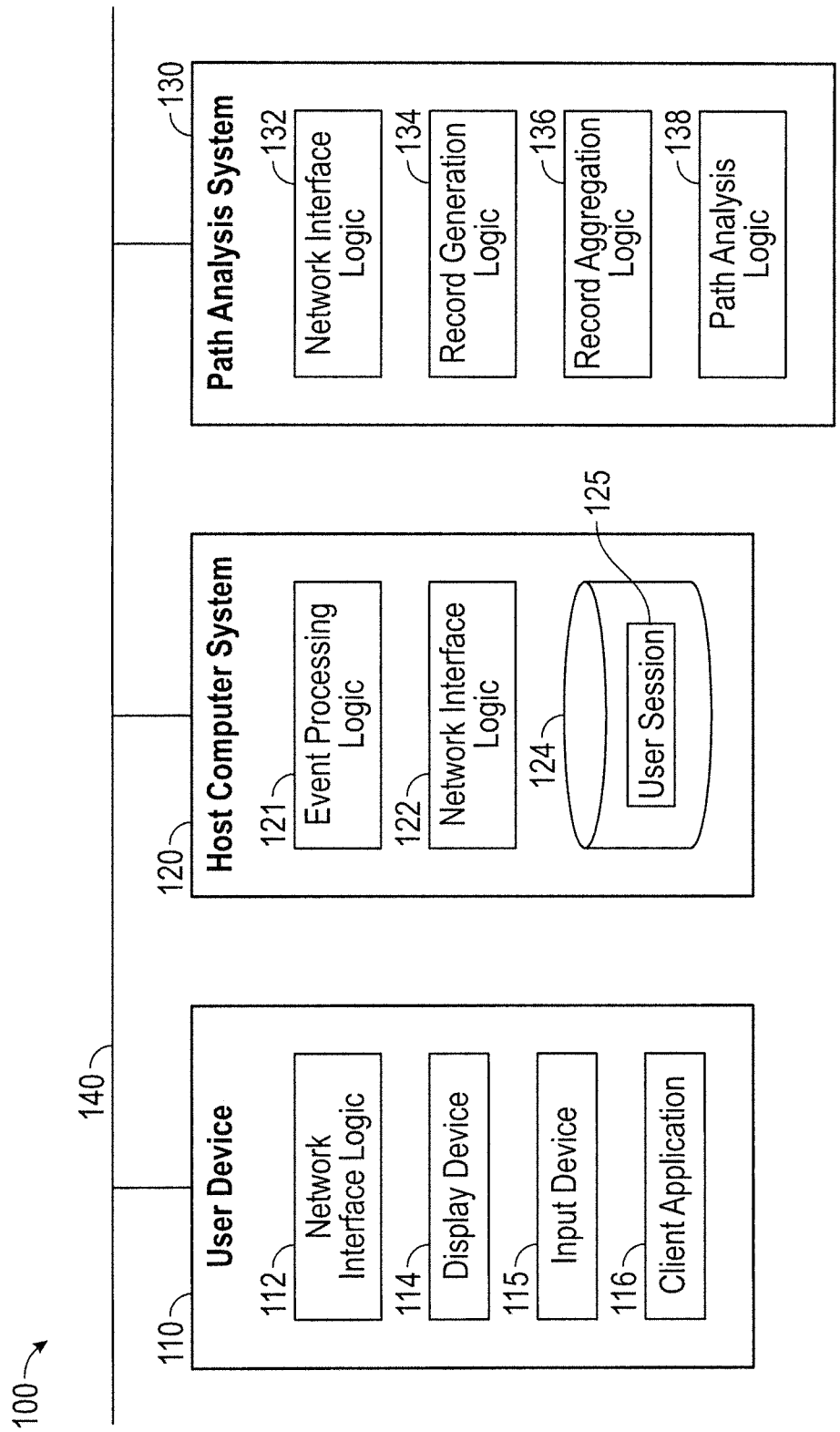
FIG. 1 is a block diagram of a system for analyzing an online user path, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for analyzing usage data from a website or other online platform are described. More particularly, the present disclosure relates to the use and analysis of online usage data (e.g., data related to an online session of a user) to modify and simplify the user experience. For instance, the disclosed systems and methods may be utilized to aggregate online usage data received from a plurality of users in order to enhance the user experience. The disclosed systems and methods allow for aggregation of online usage data from any point along a user path (i.e., within a user session), including based on a selected starting point. For instance, a plurality of user paths may be aggregated and compared based on a common event within the user paths, such as a common user selection or data entry. The aggregated data may then be used to identify performance issues associated with a particular user path, determine a more efficient or faster user path, or to otherwise improve the user experience within the online platform.

The disclosed systems and methods may be implemented to provide user path analysis for any online platform, such as a website, mobile application, network kiosk, or other online platform having a user interface. In an example embodiment the disclosed online path analysis system may be utilized as part of an online banking system. The path analysis system may be used to track a user path in performing certain tasks associated with online banking (e.g., transfers, deposits, etc.) in order to improve the user experience as it relates to the execution of a transaction or the completion of another action by the user as part of the online banking system.

In an embodiment of the present disclosure, the host computer system receives usage data related to the use of an online platform hosted by the host computer system. The online usage data may be related to a single online session for a user of the online platform. Each user session may include a chain of consecutive events or user actions that are performed by the user, forming an actual user path. The host computer system may store the actual user path for each online session, including the chain of consecutive events. This online usage data may be stored by the host computer system in a database. The host computer system may also send the online usage data to a path analysis computer system. In some embodiments, the host computer system may also generate the online usage data based on input received from the user.

The path analysis computer system receives the online usage data and manipulates the online usage data to build (e.g., generate, create, etc.) a record for each user session. Building the record may include generating (e.g., determining, building, creating, etc.) a plurality of user paths based on the actual user path of the user session. Each event (e.g., action) of the user session forms a starting point for one of the plurality of user paths, such that each of the plurality of user paths begins with a different event as a starting point and continues through the subsequent events of the user session through the final event. The path analysis computer system may be further configured to aggregate the records (e.g., the user paths) based on a common event, such that the user sessions may be analyzed in the aggregate based on a selected starting point (e.g., the common event).

Referring to FIG. 1, a user path analysis system 100 is shown, according to an example embodiment. The path analysis system 100 may be used to analyze usage data for a website or other online platform (e.g., website, mobile application, network kiosk, etc.). The usage data be related to an online user session, and may include actions performed by a user of the online platform (e.g., account holder, visitor, etc.) and other events that occur during the course of the online user session and are captured by the path analysis system 100. In one example embodiment, the path analysis system 100 is related to an online banking system. In this embodiment, an online user session may occur for the purpose of completing a transaction or another banking task that is related to an account held by the user via the online banking system. The path analysis system 100 is intended to provide enhanced path analysis for user actions and other events, including to aggregate the actions and events related to a plurality of user sessions in order to improve the user experience and improve the efficiency of the online platform.

The path analysis system 100 may include, among other systems, a user device 110, a host computer system 120, and a path analysis computer system 130. The systems may communicate through a network 140, which may include one or more of the Internet, cellular network, Wi-Fi, Wi- Max, a proprietary banking network, or any other type of wired or wireless network. In some embodiments, the host computer system 120 and path analysis computer system 130 may be owned by the same entity. In some such embodiments, the path analysis computer system 130 may be included as part of the host computer system 120. For instance, the host computer system 120 and the path analysis computer system 130 may be configured to perform any functions described herein as a function of the other system. In other embodiments, the host computer system 120 and path analysis computer system 130 may be owned or operated by different entities or systems.

The host computer system 120 and the path analysis computer system 130 may each include a computer system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, non-transitory computer storage media. The memory may include data base components, object code components, script components, or any other type of information structure for supporting the various activities and information structures described herein. The memory may be communicably connected to the processor and include computer code or instructions for executing one or more processes described herein.

The user device 110 may be used by an individual user (e.g., a consumer, etc.) to interact with an online platform (e.g., website, e-commerce platform, online banking system, etc.) provided by the host computer system 120. The user device 110 may, for example be, a cellular phone, smart phone, mobile handheld wireless e-mail device, personal digital assistant, portable gaming device, desktop computer, laptop computer, network kiosk, automated teller machine (ATM), or other suitable device. The user device 110 includes network interface logic 112, a display device 114, and an input device 115. The user device 110 may also include a client application 116 for accessing and interacting with the online platform provided by the host computer system 120. The network interface logic 112 may include, for example, program logic that connects the user device 110 to the network 140. For example, the client application 116 may be an online banking application and the user device 110 may receive and display screens including account information, transaction instructions, and so on. Screens are presented to the user via the display device 114. The input device 115 may be used to permit the user to provide input and initiate user actions or events (e.g., clicking a link or web address, entering requested credentials, etc.).

The host computer system 120 includes event processing logic 121, network interface logic 122, and database 124. In one embodiment, the host computer system 120 is operated by a banking entity providing an online banking environment that may be accessed by a user (e.g., an account holder) via the user device 110.

The host computer system 120 is configured to capture (i.e., store) data related to a user browsing session. A user session may include a chain of consecutive events or actions performed by a given user during a set period of time. In one embodiment, the user session includes all events that occur between two discrete events, such as when the user logs into and out of the online platform, or when the user enters and exits the online platform. The user session may also include the chain of consecutive events prior to a determined completed task or event, such as prior to the completion of a wire transfer or other transaction using an online banking portal provided by host computer system 120. In some embodiments, the user session may also include events or actions that are not performed by the user, but that occur during the user session. For instance, back-end server calls and page redirects are actions or events that may occur during a user session and may be included as part of the usage data, but may not be known to the user.

By way of example, data for a specific user session 125 is shown as being stored in the database 124. As will be appreciated, the database 124 may also store data regarding many other users and user sessions (not shown). The data stored for each user session is related to the events performed by the user during the user session (i.e., a user path), such as a timestamp for the event, a descriptor, a user identification, an online platform entity identification, a unique identifier, and any other information for each event that may be necessary or useful as part of the path analysis system 100. In one embodiment, event processing logic 121 is configured to receive input from the user device 110 via the network interface logic 122 and store the user session data in the database 124.

The path analysis computer system 130 includes network interface logic 132, record generation logic 134, record aggregation logic 136, and path analysis logic 138. In one embodiment, the path analysis computer system 130 is operated by the same entity as the host computer system 120. In other embodiments, the path analysis computer system 130 is separately operated from the host computer system 120.

The path analysis computer system 130 further includes record generation logic 134. The record generation logic 134 is configured to receive the user session data (e.g., from the database 124, from the event processing logic 121, etc.) and manipulate the user session data to generate a record for the user session. An example of the record generated by record generation logic 134 can be found in FIGS. 3 and 4C. The record is intended to be useable to compare the user session and its associated events with a plurality of other similar user sessions and events. To generate the record, the record generation logic 134 may order each of the events within the user session by order of occurrence. The record generation logic 134 may also remove any extraneous events or events that are not otherwise relevant or necessary to the user session or the intended task associated with the user session. For instance, the record generation logic 134 may remove any events related to refreshing the screen, or moving back and forth between screens. The record generation logic 134 may also remove items such as back-end server calls and redirects, and any other actions or events which may be made known to the server or otherwise reported as usage data, but may not be seen or known by the user. By ordering the events in order of occurrence and removing any unnecessary or unrelated events, the record should provide a close approximation of the actual user path during the user session (e.g., the actual user path to complete the associated task).

The record generation logic 134 may also generate or attach coordinates to each of the events and include the coordinates as part of the record for the user session. The coordinates may then be used to plot each event of the user path to provide a visual display of the user path. The coordinates generated or assigned to each event may be based on a location of the event occurrence (e.g., a user input) within a web page or an associated online platform page or screen. For instance, the coordinates may be X-Y coordinates corresponding to a horizontal and vertical location on a web page associated with the host computer system 120. The coordinates may then be used to generate a map for the path associated with the user session (see FIG. 6 by way of example), wherein each set of coordinates corresponds to a particular event within the actual user path. The map may provide a visual representation of the path utilized by the user to accomplish a particular task.

The record generation logic 134 is also configured to determine a plurality of separate user paths for each event in the user session. The plurality of user paths are included as part of the record. Each of the separate user paths includes a different of the events as a starting point for the user path and further includes each subsequent event in order of occurrence through the final event of the user session. For example, a first user path would begin with the first event of the user session and continue through the final event of the user session, and second user path would begin with the second event of the user session and continue through the final event. All events within the user session would be similarly used as the starting point to generate a different user path, with each successive determined user path having one less event until the final event is reached. Ultimately, the generated record will include the same number of user paths as number of events within the user session.

Once the user session is broken down into a plurality of user paths based on a selected starting event, the user session may be compared with a similar user session having a non-identical series of events. For instance, any two or more user sessions sharing an event could be compared in order to determine the most likely subsequent action or event after this shared event. The subsequent paths may also be compared. The record generated by record generation logic 134 is shown with more particularity in FIGS. 3 and 4C. The generated record may be stored in database 124.

The host computer system 120 further includes record aggregation logic 136. The record aggregation logic 136 is configured to aggregate user session data in order to provide a subset of user session data for analysis. The record aggregation logic 136 utilizes the records generated by the record generation logic 134 to aggregate the user session data. The record aggregation logic 136 may receive the records from the record generation logic 134 or the record aggregation logic 136 may be configured to retrieve the records from the database 124. The record aggregation logic 136 may aggregate the user session data (e.g., the records) based on one or more events within the user session, the associated coordinates of the events, the order of events, the user, the timestamp associated with the user session, or any other characteristic of the user session data or the generated records.

In an exemplary embodiment, the record aggregation logic 136 is configured to aggregate the records according to shared events. As described previously, the record generation logic 134 separates each user session into a plurality of user paths based on a starting event, wherein each event in the user session is the starting event of one of the user paths. Thus, the record aggregation logic 136 may aggregate all user paths determined by the record generation logic 134 in order to create a large subset of user paths having the same starting event. This information may then be used to determine the most likely subsequent event or subsequent user path based on a particular starting event (i.e., starting point for a user path). The information may also be represented visually in a web path map, such as maps 500 and 600 shown by way of example in FIGS. 5 and 6, respectively. In one example embodiment, the record aggregation logic 136 is configured to aggregate each of the shared events found within the user session data.

In one embodiment, only those records or user paths having the same final event are aggregated in order to compare only those user sessions having the same final outcome. For instance, the record aggregation logic 136 may be configured to compare (e.g., aggregate) only those user sessions ending in a successful wire transfer or another similar completed task, such that the user sessions being compared have a similar intended outcome. In another embodiment, only those records having the same starting point and final event are aggregated. In this way, any extra or wasteful steps that are sometimes found in a user path may be identified and addressed, such as by providing a clear alternative to the less efficient path or eliminating an unnecessary event altogether.

The record generation logic 134 and the record aggregation logic 136 are intended to be utilized in tandem to manipulate the usage data such that the usage data is more easily analyzed. The record generation logic 134 is configured to manipulate the usage data so that the record aggregation logic 136 is able to aggregate the usage data more easily based on common characteristics. For instance, the record generation logic 134 allows the record aggregation logic 136 to aggregate every user session in the database 124 based on a common event within the user session. Typically, an entire user path would be compared for each user session. However, by manipulating and storing the data in the previously described record (e.g., via the record generation logic 134), the system 100 is able to compare only a single subsequent event from the common event, and potentially allow for more incremental improvements to the user experience.

Figure 2:
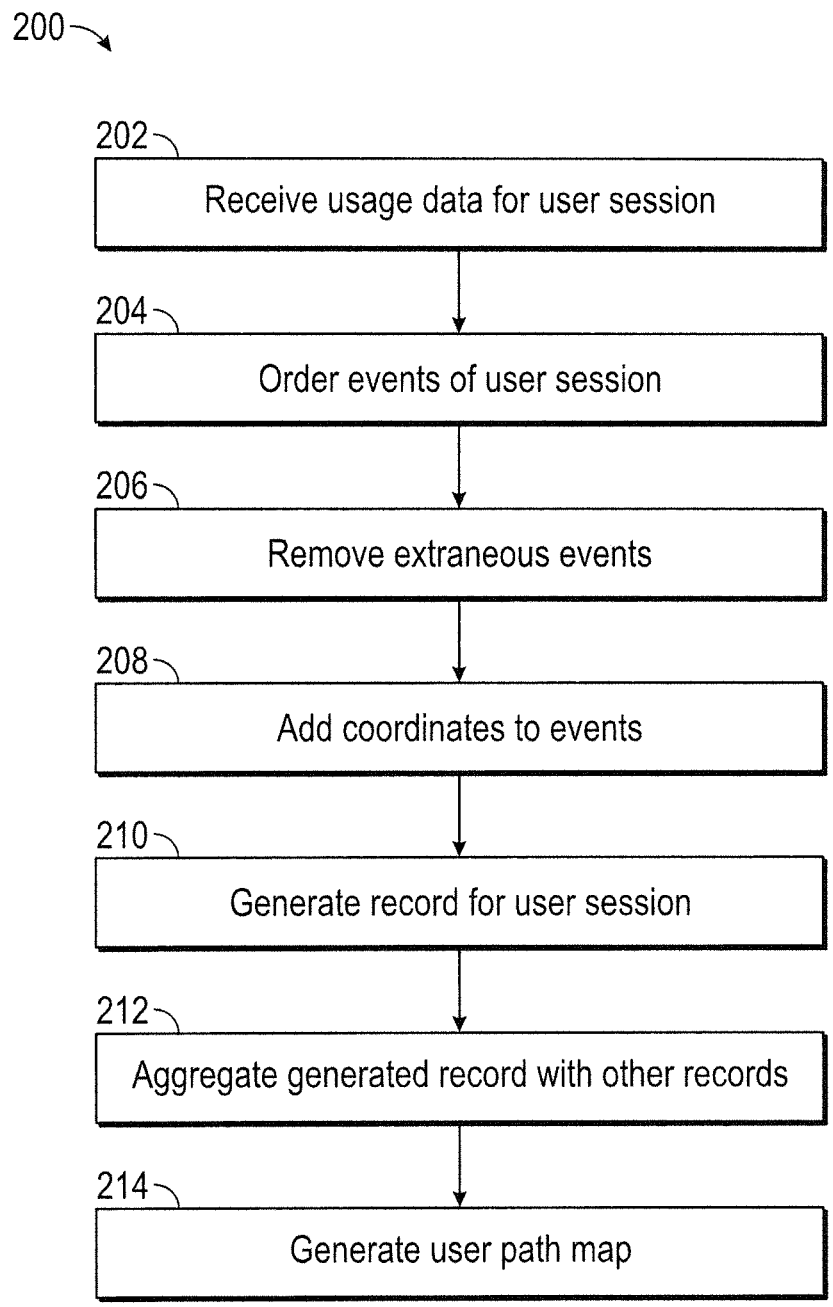
FIG. 2 is a block diagram of a process for analyzing an online user path, according to an example embodiment.

FIG. 2 illustrates a process 200 that may be implemented by the system in FIG. 1. Any of the steps described in process 200 may be performed by host computer system 120 and/or path analysis computer system 130. Process 200 may be used to analyze a plurality of user sessions in an online environment or platform. At 202, the process 200 includes receiving the usage data. The usage data is based on input received from the user device 110 and relates to events performed by a user while interacting with the online platform hosted by host computer system 120. The usage data may be raw data. In an example embodiment, the usage data includes a plurality of events within a user session. The usage data may include a time stamp for each event, identifying information related to the entities involved, a unique identifier for the user session and/or the event, a brief description of the event, and any other information relevant to the user session and/or the events of the user session.

The usage data may be for a single user session, which may include a consecutive chain of events represented by a user path. The usage data may also be received as a plurality of user sessions for a plurality of users. In some embodiments, the usage data may not be sorted by user or user session. In these embodiments, the host computer system 120 and/or the path analysis computer system 130 may be configured to sort the usage data by user session and/or user. The usage data may be received from the user device 110 or generated at the host computer system 120 based on input from the user device 110. In an example embodiment, the usage data is generated at the host computer system 120 and received by the path analysis computer system 130.

At 204, the process 200 may include ordering the events (e.g., user actions) of the user session in order of occurrence. The events of the user session may be ordered by the host computer system 120 or the path analysis computer system 130. In an example embodiment, the events are grouped in a true order, specific to each event and its time of occurrence. At 206, the process 200 may include removing extraneous or unnecessary events from the user session, such as when the user refreshes the page, selects back or forward on the browser, or other similar events that are not pertinent to the task associated with the user session. The extraneous events may be removed by the host computer system 120 or the path analysis computer system 130.

At 208, the process 200 may include generating or providing coordinates for each of the events of the user session. The coordinates may correspond to an associated web page or screen of the online platform, such that each set of coordinates is representative of an action on the screen by the user. For instance, the coordinates may be plotted on a graph to show a user path representative of the user session. The coordinates may be provided as part of the usage data or the coordinates may be determined by systems 120 and/or 130 based on the associated event.

At 210, the process 200 may include generating a record for the user session. The record may be generated by the path analysis computer system 130, or as part of the host computer system 120. As received as part of the usage data, the user session includes a single user path through the consecutive events performed by the user. However, generating the record includes generating a plurality of user paths based on the single user session. In an example embodiment, each of the plurality of generated user paths includes a different of the events as a starting event or starting point. Each user path then includes each of the subsequent events of the user session up to and through the final event. Thus, each generated user path may have a different event as a starting point or starting event and will have a unique length (i.e., event length) within a particular user session. Each new user path within the record may now be aggregated or compared with any other user path having the same starting event. Thus, more data can be culled from the each user session and the user experience can be improved upon and responded to more quickly.

At 212, the process 200 may include aggregating the generated record with other records. The records may be aggregated using the path analysis computer system 130 and/or the host computer system 120. As described previously, the generated user paths may be aggregated with other user paths having the same starting point. Similarly, the records may be broken down further to obtain more information. Records and user paths may be aggregated based on a similar user, a similar final event, a similar time of day, month, year, etc., a similar number of events, similar coordinates, or any other data present within the record.

At 214, the process 200 may include generating a user path map. The map may be generated by the path analysis computer system 130 or as part of the host computer system 120. The map may show one or more user paths generated or determined as part of generating the record. The map may show an aggregated user path based on aggregating one or more records. User path maps are shown by way of example in FIGS. 5 and 6.

Figure 3:
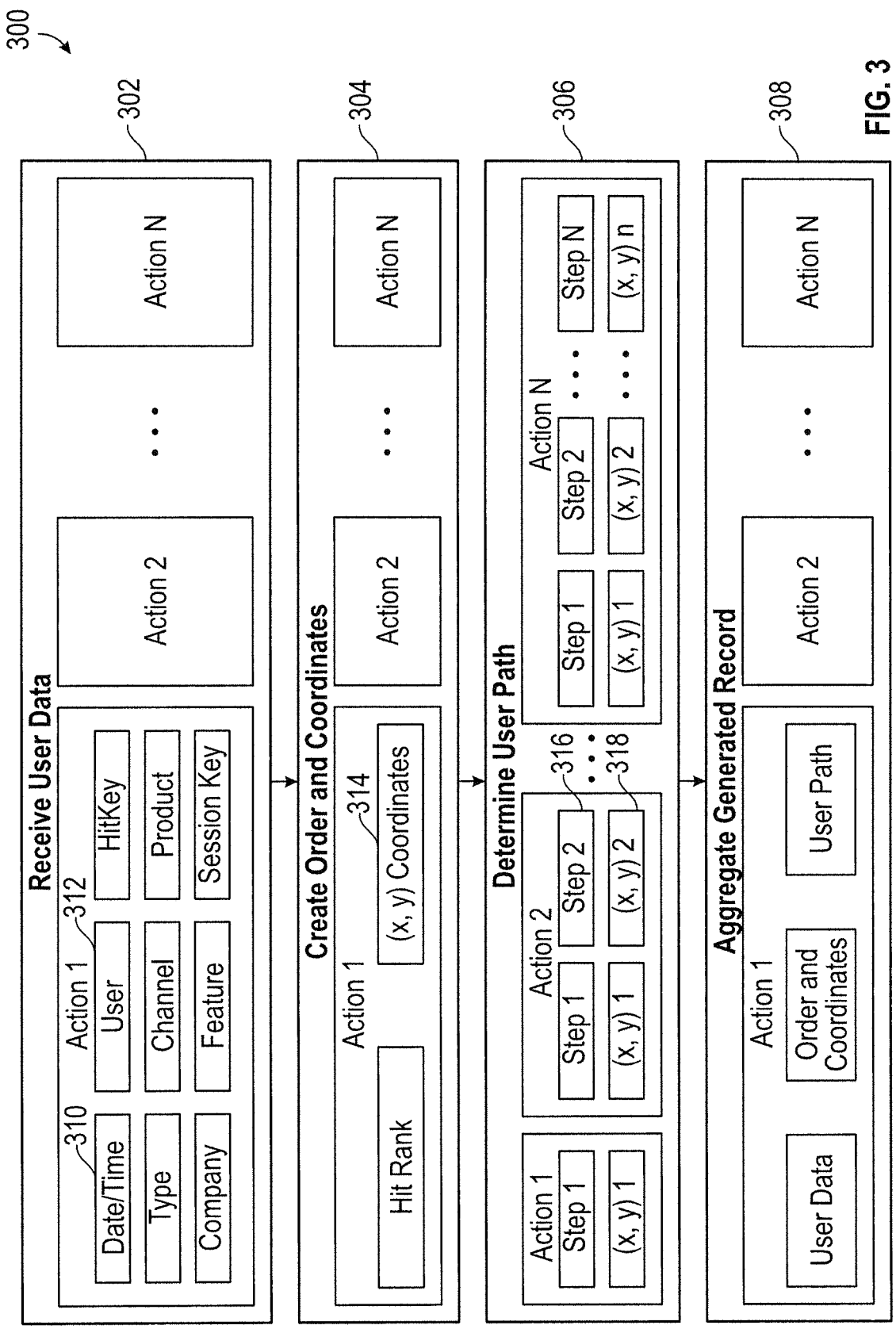
FIG. 3 is a flow diagram illustrating the flow of data through the system of FIG. 1, according to an example embodiment.

Referring now to FIGS. 3 and 4, the flow of usage data is shown from receipt of the usage data to aggregation of the generated record. The usage data may be received and manipulated to generate the record according to process 200. FIG. 3 includes usage data that is non-specific to a particular use or online platform, while FIG. 4 includes usage data related to a wire transfer for an online banking system. Referring to FIG. 3, a process 300 is shown for analyzing usage data related to a user session within an online environment, including generating a record based on the usage data. The process 300 may be executed or performed using any of systems 120 and 130. At 302 (and FIG. 4A), usage data is received for an online user session. The usage data is shown to include information related to an online user session, including a number of events or actions (e.g. Action 1, Action 2, etc.) performed by the user. Each event (e.g., Action 1) is further described within the usage data, including any identifying information for the event such as a time stamp (e.g., date/time 310), an associated user (e.g., user 312), an associated product, an associated hitkey, a type of event, a channel, a company associated with the event, a feature, and a session key. The usage data may include a plurality of events (e.g., Action 1, Action 2, Action N) comprising a user session, and may also include a plurality of user sessions. The usage data may also include data and/or events that are not sorted by user session and/or user. In such an embodiment, the systems 120 and/or 130 may be configured to sort the data according to user session in order to build the record for the user session.

At 304 (and FIG. 4B), the process 300 includes sorting (e.g., ordering, manipulating, etc.) the usage data such that the events (e.g., Action 1, Action 2) of the user session are ordered according to order of occurrence (e.g., date/time, time stamp). In the illustrated embodiment, Action 1 may be the first event of a user session, and Action N may be the final event. The ordered events are also shown to include coordinates 314 which may correspond to X-Y coordinates on a web page or screen, or may correspond to a location on a user path map. The systems 120 and/or 130 may determine the coordinates 314 of Action 1, for instance, based on the events described in the usage data. The coordinates 314 may be determined based on the usage data received from the host computer system 120, as an example. The coordinates for each of the ordered events (e.g., coordinates 314) may be used to generate one or more user path maps, which are shown by way of example in FIGS. 5 and 6.

Figure 6:
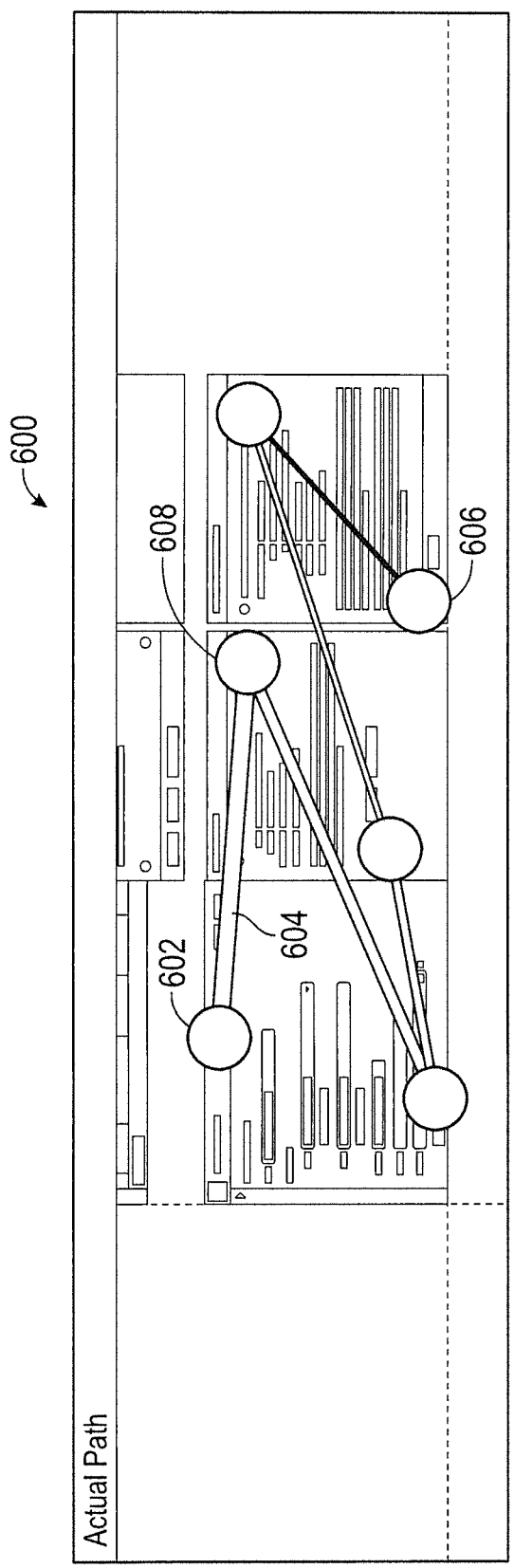
FIG. 6 is a user map illustrating an aggregated user path from a selected starting point, according to an example embodiment.

Still referring to FIGS. 3 and 4, once the events are ordered, at 306 (and FIG. 4C) the process 300 includes generating (e.g., by systems 120, 130) a record for the online user session based on the events. Generating the record may include determining (e.g., building, generating, etc.) a plurality of user paths based on each event as a starting point (i.e., starting event). For instance, the process 300 may include generating a user path based on each event within the online user session as a starting event. The user paths may include each subsequent step from the ordered events of the previous table up to and including the final event (e.g., action N). The user path may also include a description of each event that includes relevant identifying information 316 as well as coordinates 318 associated with the event. The coordinates 318 may be used to generate a user path map for each generated user path (as shown in FIG. 6).

At 308, the process 300 may include aggregating the record (i.e., aggregating the user path(s)). The record may be aggregated to combine all information that is derived or generated from the usage data and related to the single user session. The record may also be aggregated with other records having similar events. For instance, each user path within the record may be aggregated with other user paths from other records having the same starting point (i.e., starting event). In this way, a preferred user path from a selected starting point may be determined and shown to the end user. For instance, the likelihood of a particular event from a selected starting point may be determined and may also be used to generate a user path map (see FIG. 5) for the end user. This information may be used to determine an expected user path from a selected starting event to a selected final event.

Referring further to FIG. 4A, usage data 400 is shown for an online user session, according to an example embodiment. The usage data 400 includes a plurality of events 402 (i.e., represented by each row of the table of FIG. 4A) within the online user session, which may include actions performed or initiated by a user within an online environment or platform. As shown, the usage data 400 may include data for each of the events 402 within the user session, including a timestamp 404 for the event, user information 406, a channel 408 for accessing the online environment, a feature 410 associated with the event, and other identifying information such as a hit key 412 and a session key 414. The usage data 400 may be received by the path analysis computer system 130 and used to generate one or more user paths and a record for the associated online user session.

Referring further to FIG. 4B, table 420 shows the events 402 arranged (i.e., ordered) in order of occurrence. The order of occurrence may be determined based on the timestamps 404. Hit rank 422 is representative of the order of occurrence for each of the events 402. Table 420 also includes an x-coordinate 424 and a y-coordinate 426 for each of the events 402. The X-Y coordinates 424, 426 may represent a location of the event 402 (i.e., an action) in an online environment, such as a relative location on a screen or user interface. Referring further to FIG. 4C, table 430 shows a plurality of user paths 432-444 that were generated (i.e., by the path analysis computer system 130) based on a single online user session. The plurality of user paths 432-444 are each generated based on a different starting event of the plurality of events 402. Each user path 432-444 includes each subsequent event of the online user session in order of occurrence, up to and including the final event (e.g., event 444).

Figure 5:
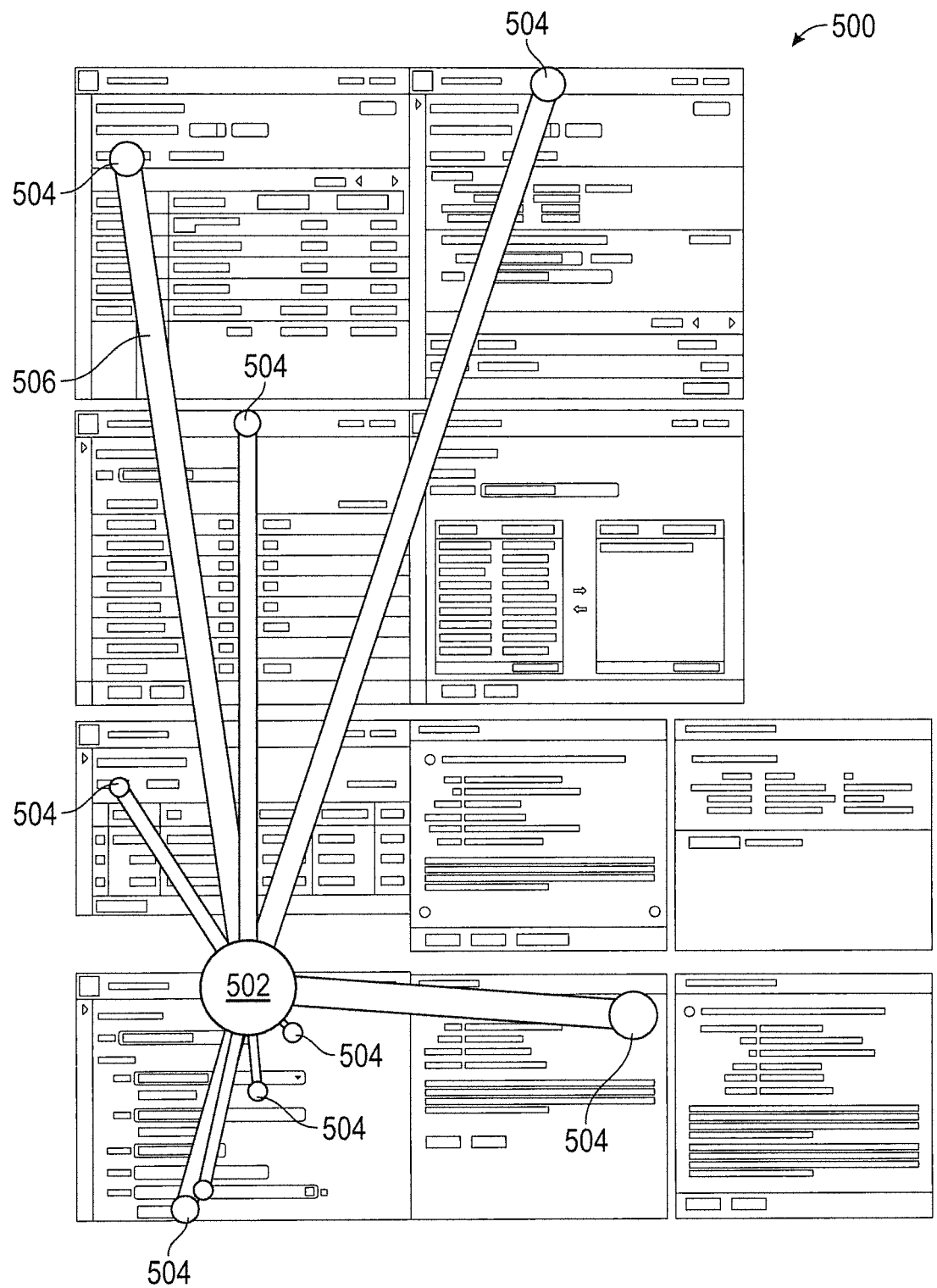
FIG. 5 is a user path map illustrating a plurality of user paths aggregated from a selected starting point, according to an example embodiment.

Referring now to FIG. 5, a user path map 500 is shown, according to an example embodiment. The map 500 is based on a plurality of user paths that were generated from a number of user sessions, wherein each of the user paths include the same starting point (e.g., first event) 502. Each node 504 represents an action or event performed by one of the users after an action or event occurred at starting point 502 (i.e., the starting event). Paths 506 connect each of the nodes 504 to the starting point 502, illustrating each of the user paths previously traveled from starting point 502 to nodes 504. The paths 506 are represented by weighted lines. The weighted lines are intended to illustrate a ratio or percentage of previous users that selected each of the nodes 504 as the subsequent step. For instance, if the path 506 is weighted more heavily, then the path 506 is more popular in the selected subset of aggregated user paths than a line that is weighted less heavily, meaning that more users have traveled to the associated node 504 from the starting point 502 than have traveled to another node 504 having a thinner associated path 506. In one embodiment, the map 500 may be automatically generated after the record aggregation logic 136 is executed. The map 500 may be provided to an end user in order to provide a visual interpretation of a number of aggregated user paths, such as to show which nodes 504 (i.e., actions) have been selected most often after selection of the starting point 502 by a user.

Referring now to FIG. 6, a user path map 600 is shown, according to an example embodiment. The map 600 is also based on a plurality of user paths that have been aggregated (e.g., by record aggregation logic 136) to provide aggregated data for the map 600. In the illustrated embodiment, the map 600 includes a starting point 602 (i.e., starting event). Path 604 shows a path from starting point 602 to final event 606. The path 604 is weighted such that a more heavily-weighted line represents a greater percentage of user paths utilizing the shown path 604. For instance, the path 604 at the starting point 602 is thicker than the path at the final event 606, indicating that the number of users selecting the particular path shown dwindles as the path 604 approaches the final event 606. This may be due to users performing other actions or ending a user session.

In an example embodiment, the path 604 between the starting point 602 and node 608 represents one of the available paths 506 shown in FIG. 5. For instance, if the user were to the select node 608 as the next action or as a selected starting point, the map 500 may be regenerated to show the new available actions and user preference statistics based on this new selected starting point. The map 600 merely shows one available user path from the starting point 602 to the final event 606 in the illustrated embodiment of FIG. 6, but the end user may be able to manipulate any of the path 604 or the nodes to show an alternative path and the associated user preferences (e.g., the weighted lines).

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method performed by one or more processors of a path analysis computer system, the method comprising:
   receiving, by the path analysis computer system, usage data related to a user session within an online environment, wherein the usage data includes a plurality of events occurring within the user session, the events corresponding to interactions with an online user interface displayed on a mobile computing device;
   generating, by the path analysis computer system, a plurality of user paths for the user session based on the usage data, including generating a separate user path beginning with each of the plurality of events, wherein each of the user paths is generated by:
      selecting one of the plurality of events as a starting event;
      arranging the plurality of events subsequent to the starting event in order of occurrence; and
      generating the user path to include the starting event and each of the subsequent events up to and including a final event;
   determining, by the path analysis computer system, a preferred user path between a selected starting event and a selected final event, wherein the preferred user path is determined by:
      determining, by the path analysis computer system, a likely subsequent event in a likely user path between the selected starting event and the selected final event; and
      comparing, by the path analysis computer system, the likely subsequent event in the likely user path to the plurality of events in one of the generated user paths having the same starting event and final event, including determining any differences between the plurality of events in the generated user path and the likely subsequent event in the likely user path;
   determining, by the path analysis computer system, coordinates for one or more of the plurality of events based on the usage data, wherein the coordinates correspond to a relative location of the one or more events within the online user interface; and
   generating, by the path analysis computer system, a map based on the plurality of events, including plotting each of the plurality of events based on the coordinates.

2. The computer-implemented method of claim 1, further comprising:
   aggregating, by the path analysis computer system, one of the generated user paths with a second user path based on the starting event, wherein the second user path is based on a second user session within the online environment.

3. The computer-implemented method of claim 2, wherein the starting event is determined by the path analysis computer system based on a selection received via an end user of the system.

4. The computer-implemented method of claim 1, further comprising:
   prior to generating the plurality of user paths, removing, by the path analysis computer system, one or more of the plurality of events from the user session based on relevance to the user session.

5. The computer-implemented method of claim 1, wherein generating the map includes plotting the events of a second user session having in common the starting event and the final event with the user session.

6. A path analysis computer system, comprising:
   a processor; and
   a memory coupled to the processor and having instructions stored therein that, when executed by the processor, cause the path analysis computer system to:
   receive usage data related to a user session within an online environment, wherein the usage data includes a plurality of events occurring within the user session, the events corresponding to interactions with an online user interface displayed on a mobile computing device;
   generate a plurality of user paths for the user session based on the usage data, including generating a separate user path beginning with each of the plurality of events, wherein each of the user paths is generated by:
      selecting one of the plurality of events as a starting event;
      arranging the plurality of events subsequent to the starting event in order of occurrence; and
      generating the user path to include the starting event and each of the subsequent events up to and including a final event;
   determine a preferred user path between a selected starting event and a selected final event, wherein the preferred user path is determined by:
      determining a likely subsequent event in a likely user path based on the selected starting event and the selected final event; and
      comparing the likely subsequent event in the likely user path to the plurality of events in one of the generated user paths having the same starting event and final event, including determining any differences between the plurality of events in the generated user path and the likely subsequent event in the likely user path;

determine coordinates for one or more of the plurality of events based on the usage data, wherein the coordinates correspond to a relative location of the one or more events within the online user interface; and generate a map based on the plurality of events, including plotting each of the plurality of events based on the coordinates.

7. The path analysis computer system of claim 6, wherein the processor is further configured to:

aggregate one of the generated user paths with a second user path based on the starting event, wherein the second user path is based on a second user session within the online environment.

8. The path analysis computer system of claim 7, wherein the starting event is determined by the path analysis computer system based on a selection received via an end user of the system.

9. The path analysis computer system of claim 6, wherein the processor is further configured to:

prior to generating the plurality of user paths, remove one or more of the plurality of events from the user session based on relevance to the user session.

10. The path analysis computer system of claim 6, wherein generating the map includes plotting the events of a second user session having in common the starting event and the final event with the user session.

11. A computer-implemented method performed by one or more processors of a path analysis computer system, the method comprising:

receiving, by the path analysis computer system, usage data related to a user session within an online environment, wherein the usage data includes a plurality of events occurring within the user session, the events corresponding to interactions with an online user interface displayed on a mobile computing device;

generating, by the path analysis computer system, a plurality of user paths for the user session based on the usage data, including generating a separate user path beginning with each of the plurality of events, wherein each of the user paths is generated by:

selecting one of the plurality of events as the starting event;

ordering those events from the plurality of events which are subsequent to the starting event in order of occurrence; and generating the user path to include the starting event and each subsequent event of the plurality of events, up to and including a final event;

generating, by the path analysis computer system, a record for the user session by aggregating the plurality of generated user paths for the user session;

aggregating, by the path analysis computer system, the generated record with a second record, wherein the second record is based on a second user session within the online environment, and wherein the aggregating includes combining one or more of the plurality of user paths with one or more user paths of the second record based on a shared characteristic;

determining, by the path analysis computer system, within the record based on the usage data, a preferred user path between a selected starting event and a selected final event, wherein the preferred user path is determined by:

determining, by the path analysis computer system, a likely subsequent event in a likely user path between the selected starting event and the selected final event; and comparing, by the path analysis computer system, the likely subsequent event in the likely user path to the plurality of events in one of the generated user paths having the same starting event and final event, including determining any differences between the plurality of events in the generated user path and the likely subsequent event in the likely user path;

determining, by the path analysis computer system, coordinates for the events included within the record based on the usage data, wherein the coordinates correspond to a relative location of the events within the online environment; and generating, by the path analysis computer system, a map based on the plurality of user paths, including plotting each of the plurality of events based on the coordinates.

12. The computer-implemented method of claim 11, wherein the shared characteristic includes at least one of the starting event and the final event.

13. The computer-implemented method of claim 11, further comprising:

prior to generating the plurality of user paths, removing, by the path analysis computer system, one or more of the plurality of events from the usage data based on relevance to the user session.

14. The computer-implemented method of claim 13, further comprising:

prior to generating the plurality of user paths and subsequent to removing one or more of the plurality of events, arranging, by the path analysis computer system, the remaining events of Zthe plurality of events in order of occurrence.

* * * * *